United States Patent [19]

Moorehead

[11] 3,920,203

[45] Nov. 18, 1975

[54] THRUST CONTROL APPARATUS FOR OBTAINING MAXIMUM THRUST REVERSAL IN MINIMUM TIME UPON LANDING OF AN AIRCRAFT

[75] Inventor: James R. Moorehead, Bellevue, Wash.

[73] Assignee: The Boeing Company, Seattle, Wash.

[22] Filed: Dec. 23, 1974

[21] Appl. No.: 535,996

[52] U.S. Cl............ 244/42 CC; 244/23 D; 244/81; 244/110 B
[51] Int. Cl.² ................... B64C 21/04; B64C 15/06
[58] Field of Search .......... 244/12 D, 23 D, 42 CC, 244/42 CD, 110 B, 81, 42 CF, 52; 60/226 A

[56] References Cited
UNITED STATES PATENTS

| | | | |
|---|---|---|---|
| 3,040,524 | 6/1962 | Kurti | 60/35.54 |
| 3,068,646 | 12/1962 | Fletcher | 60/35.6 |
| 3,179,353 | 4/1965 | Peterson | 244/52 X |
| 3,248,878 | 5/1966 | Clark et al. | 60/35.54 |
| 3,262,268 | 7/1966 | Beavers | 60/35.54 |
| 3,386,247 | 6/1968 | Gross et al. | 60/226 |
| 3,455,111 | 7/1969 | Allcock | 60/226 A |
| 3,484,847 | 12/1969 | Poole | 60/226 |
| 3,614,028 | 1/1971 | Kleckner | 244/42 DA X |
| 3,658,279 | 4/1972 | Robertson | 244/42 CC X |

FOREIGN PATENTS OR APPLICATIONS 1,128,832  10/1968  United Kingdom

*Primary Examiner*—Trygve M. Blix
*Assistant Examiner*—Barry L. Kelmachter
*Attorney, Agent, or Firm*—Christensen, O'Connor, Garrison & Havelka

[57] ABSTRACT

The thrust control apparatus of the present invention is employed on an aircraft having a wing and a turbofan engine mounted on a strut extending downwardly and forwardly from the wing. The thrust control apparatus includes (a) a rearwardly opening turbine engine nozzle for directing primary turbine exhaust effluent rearwardly from the engine, (b) a fan and an annular fan duct surrounding the forward portion of the turbine engine, (c) a primary fan air duct being coupled to the annular fan air duct, extending upwardly and rearwardly from the annular fan duct, and terminating in a separate rearwardly opening fan air nozzle for directing the secondary fan effluent rearwardly from the engine, and (d) a first auxiliary duct being coupled to the primary fan air duct, extending upwardly therefrom, and terminating in an upwardly opening auxiliary fan air nozzle for directing fan air flowing through the first auxiliary duct upwardly in front of the aircraft wing. During cruise operation, a valve associated with the coupling between the primary duct and the first auxiliary duct is positioned to close the first auxiliary duct, allowing all of the fan effluent to be exhausted through the fan air nozzle. Upon approach to landing, the valve associated with the coupling of the primary duct and the first auxiliary duct is adjusted to a position where it bifurcates the fan effluent between the primary duct and the first auxiliary duct. At the same time the engine throttle is advanced, calling for the turbofan engine to generate near maximum r.p.m. A plurality of vanes in the first auxiliary nozzle directs the fan effluent flowing through the first auxiliary duct upwardly and rearwardly over the upper airfoil surface of the wing. Upon touchdown of the aircraft on the landing field, the valve associated with the coupling between the primary duct and the first auxiliary duct closes the primary duct diverting the entire flow of fan effluent through the first auxiliary duct. At the same time the plurality of vanes in the first auxiliary nozzle are shifted to direct the fan effluent upwardly and forwardly relative to the engine and the wing, thus reversing the flow direction of the fan effluent and providing a reverse thrust component to brake the aircraft.

13 Claims, 11 Drawing Figures

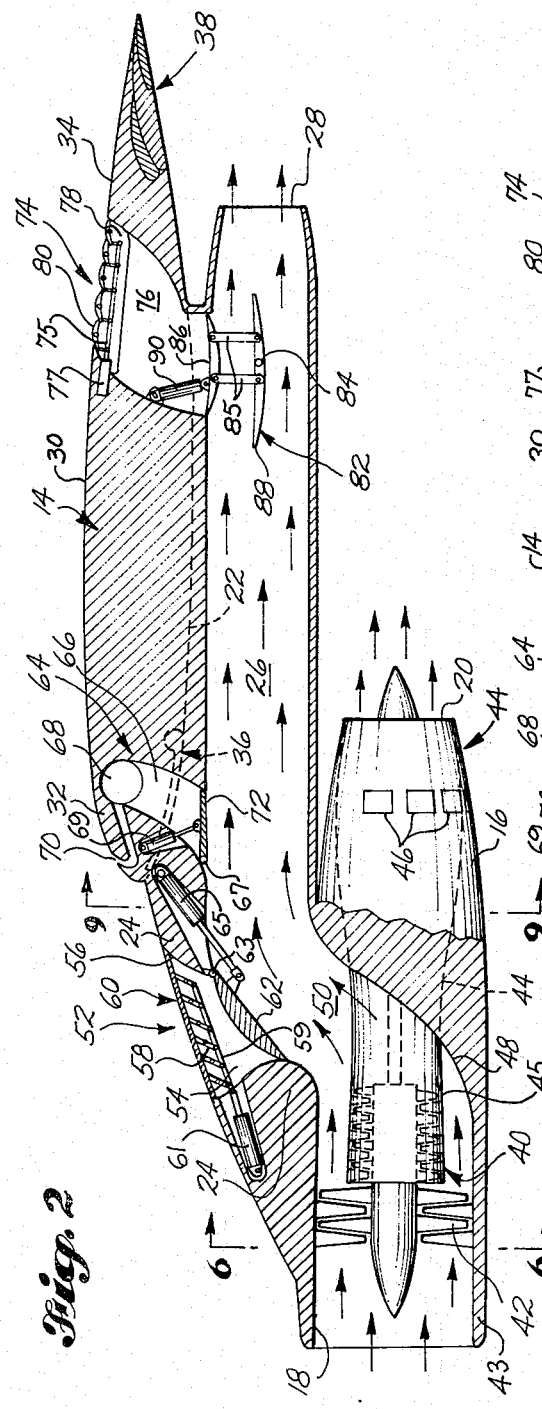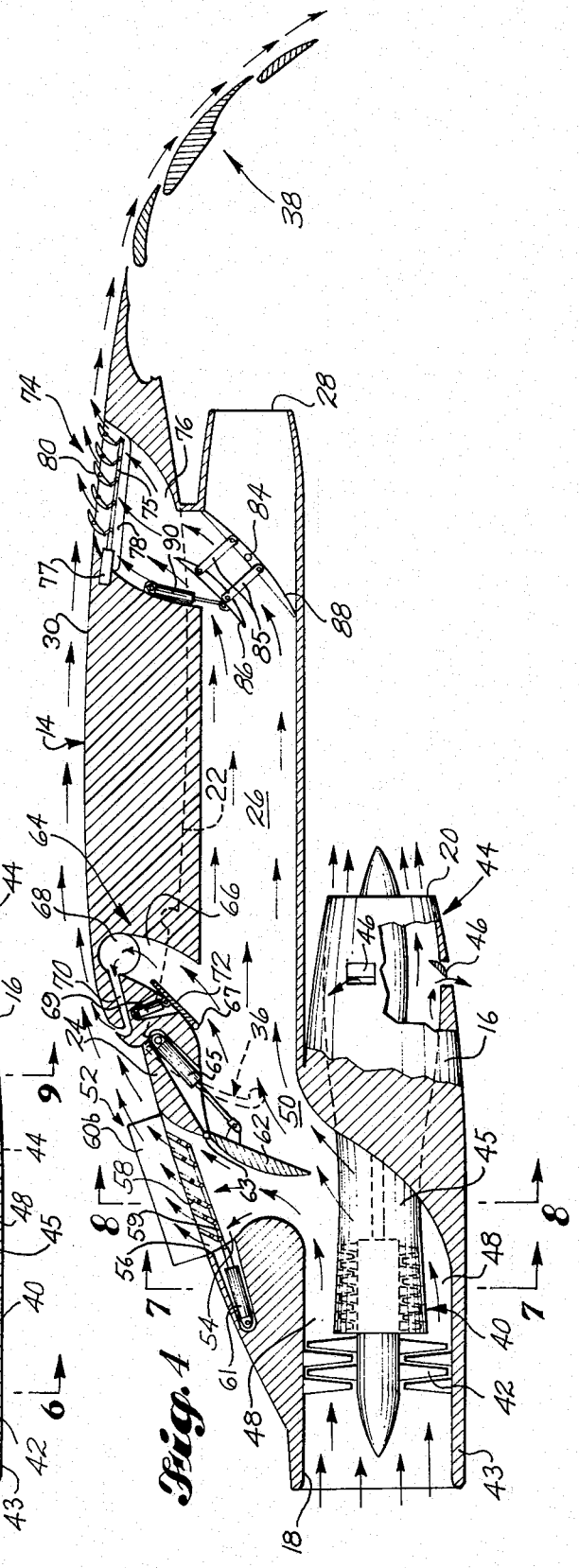

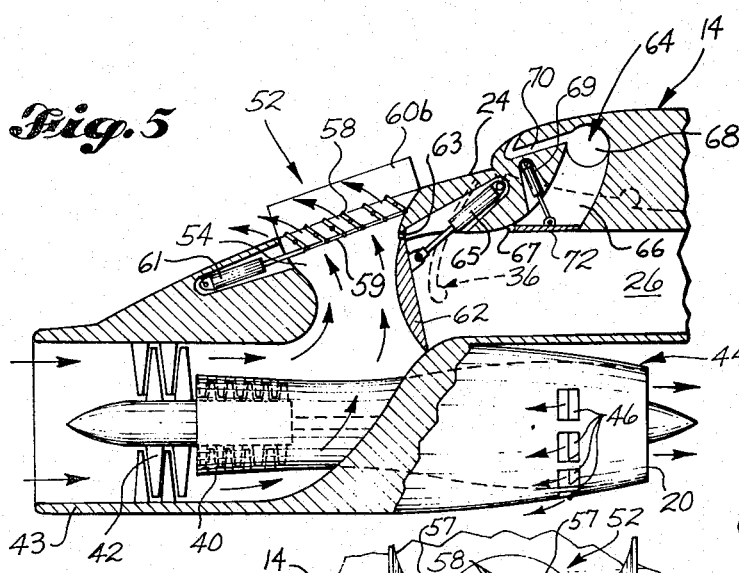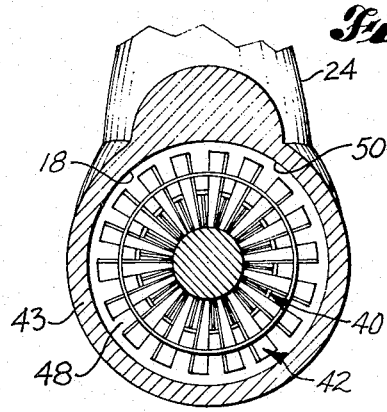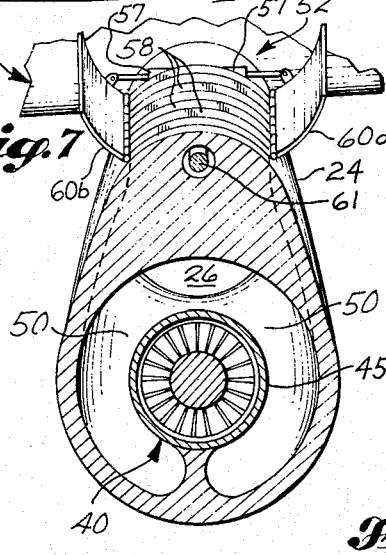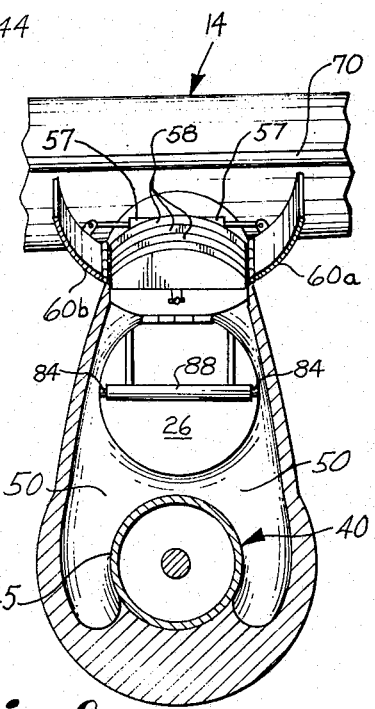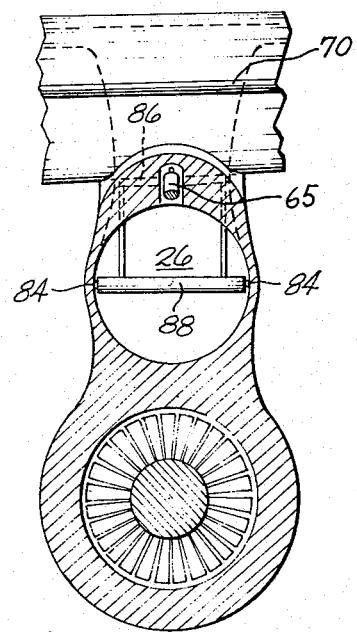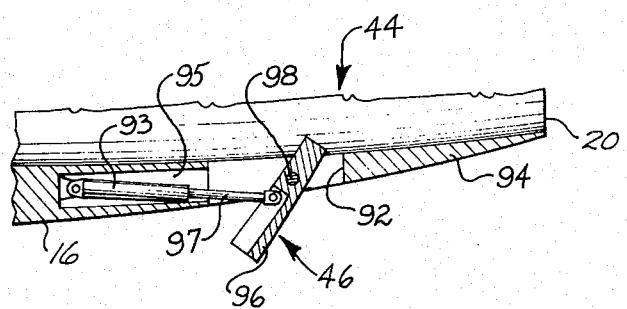

THRUST CONTROL APPARATUS FOR OBTAINING MAXIMUM THRUST REVERSAL IN MINIMUM TIME UPON LANDING OF AN AIRCRAFT

BACKGROUND OF THE INVENTION

The present invention relates to thrust control apparatus for a jet propulsion engine mounted on an aircraft, and more specifically, to apparatus employed with a jet propulsion engine to obtain a relatively large thrust reversal in a minimum time interval after touchdown of the aircraft.

When conventional or STOL aircraft employing jet propulsion engines approach a landing field, the jet propulsion engines are normally throttled down so that the engines are producing less than maximum thrust, resulting in a reduction of the forward speed of the aircraft. This is necessary to achieve a desired glide path as well as to achieve an acceptable landing speed. Upon approach, the glide path of the aircraft is normally controlled by varying the throttle setting of the aircraft, thus increasing or decreasing the forward thrust with a concomitant alteration of the forward speed and descent rate of the aircraft. When the aircraft touches the landing field, the pilot normally dumps the available lift from the wings by retracting the flaps and/or extending wing spoilers. At the same time the pilot actuates conventional thrust reversing mechanism to reverse the flow of exhaust effluent from the jet propulsion engines from a rearward direction to a forward direction, thereby reversing the thrust to brake the aircraft. When the thrust reversing mechanism is actuated to a thrust reversing position, the pilot will also normally advance the throttle setting to generate near maximum reverse thrust for braking the aircraft as quickly as possible.

Inherently, jet propulsion engines require several seconds to respond to a change from an intermediate throttle setting to a near maximum throttle setting. During this time interval, the aircraft can roll a substantial distance down the runway from its touchdown location. It follows that, the longer this time interval is, the greater the rolling distance will be before the aircraft can be brought to a complete stop. At present no effective system has been developed that will allow a pilot to adjust the throttle of a jet propulsion engine to generate near maximum engine r.p.m. before touchdown while maintaining a relatively low forward speed and a desired descent rate.

Accordingly, it is a broad object of the present invention to provide thrust control apparatus associated with a jet propulsion engine that will allow the jet propulsion to develop near maximum r.p.m. with adequate thrust during the last stages of approach to landing while maintaining an acceptable forward speed and descent rate. It is a further object of the present invention to incorporate such apparatus into an aircraft having an auxiliary nozzle that directs at least a portion of the exhaust effluent from the jet propulsion engine over the upper airfoil surface of the aircraft during approach. An object ancillary to the latter object is to provide apparatus to direct a portion of the exhaust effluent from the engine not only over the forward portion of the upper airfoil surface, but also to initially direct a portion of the exhaust effluent over the aft portion of the upper airfoil surface including the upper surfaces of extended trailing edge flaps. It is another object of the present invention to provide apparatus that immediately after touchdown, is capable of diverting a substantial portion of the exhaust effluent being directed over the wing in a forward and upward direction to provide braking for the aircraft. It is a further object of the invention to provide thrust control apparatus that will enable all lift augmentation derived through thrust control to be eliminated upon touchdown. It is an additional object of the present invention to provide means for automatically reversing the thrust upon touchdown of the aircraft. It is still a further object of the present invention to provide means during the last stages of approach to landing for varying the forward thrust generated by the jet propulsion engine to thereby vary the forward speed and the descent rate of the aircraft.

SUMMARY OF THE INVENTION

The foregoing objects, and other objects that will become apparent to one of ordinary skill upon reading the following specification, are provided in a thrust control apparatus for a turbofan jet propulsion engine mounted on an aircraft wing. The turbofan jet propulsion engine employed with this apparatus includes a turbine engine, which generates a hot primary exhaust effluent, having an outer wall terminating in a turbine engine nozzle means for directing primary exhaust effluent from the turbine engine rearwardly relative to the wing. The jet propulsion engine also includes a cowl surrounding and spaced outwardly from the wall surrounding the compressor of the turbine engine. The cowl and the compressor wall define a rearwardly extending annular fan duct. A fan, driven by the turbine engine is operatively positioned in the duct to generate a cool secondary exhaust effluent. This secondary effluent is directed rearwardly through the fan duct. In this environment the thrust control apparatus comprises a primary fan air duct and means operatively coupling the primary fan air duct to the annular fan duct for collecting the secondary effluent from the annular fan duct. The primary fan air duct terminates in a fan nozzle means for directing the secondary effluent flowing through the primary fan air duct rearwardly relative to the wing. The apparatus further comprises an auxiliary fan air duct and means operatively coupling the auxiliary fan air duct to the primary fan air duct. The auxiliary fan air duct includes an auxiliary fan air nozzle means for directing secondary effluent flowing through the auxiliary fan air duct in an upward direction relative to the wing. A first valve means for varying the flow through the primary fan air duct and the auxiliary fan air duct is normally adjusted to a cruise position wherein the auxiliary fan air duct is closed, allowing the secondary effluent to flow through the primary fan air duct and exhaust from the fan nozzle means. Upon approach, the first valve means is selectively adjusted to an intermediate approach position wherein the flow through the primary fan air duct is bifurcated so that a portion of the secondary effluent is diverted into the auxiliary fan air duct. A vane means operatively associated with the auxiliary nozzle means is so oriented during approach to divert the secondary effluent rearwardly relative to the wing and preferably over the upper airfoil surface of the wing. Upon touchdown, the first valve means is selectively adjusted to a reversing position to close the primary fan air duct and divert the entire flow of secondary effluent through the auxiliary fan air duct. At the same time the vane means is also selectively moved to a reversing position to divert the secondary effluent exhausting through the auxiliary nozzle in an upward and forward direction relative to the wing. In other aspects of the invention, a second auxiliary fan air duct is operatively coupled to the primary duct at a location rearward from the first auxiliary duct. The second auxiliary duct terminates in a second auxiliary nozzle means adjacent the rearward portion of the upper surface of the wing for directing the secondary effluent flowing through the second auxiliary duct rearwardly over the aft portion of the wing and extended trailing edge flaps. A second valve means is operatively associated with the primary duct and the second auxiliary duct, and is normally adjusted to a cruise position wherein all of the secondary effluent is permitted to flow through the primary fan air duct and be discharged rearwardly from the primary duct nozzle means. Upon approach, the second valve means is selectively adjusted to an approach position wherein all of the secondary effluent that would otherwise be discharged from the fan nozzle means in the primary fan air duct is diverted into the second auxiliary duct and is discharged from the second auxiliary nozzle over the upper surfaces of the aft portion of the wing and the flaps. The flow through the second auxiliary duct is terminated when the first valve means is adjusted to its reversing position, thereby eliminating the lift augmentation obtained via discharge of secondary effluent from the second auxiliary nozzle means. In still another aspect, secondary effluent can be supplied to a leading edge boundary layer control system employed in conjunction with leading edge flaps. In still other aspects a touchdown sensing device can be employed to automatically initiate adjustment of the first valve means to its reversing position and to simultaneously adjust the vane means to its reversing position. The foregoing apparatus allows the jet propulsion engine to be operated at or near full throttle setting prior to touchdown. Upon touchdown the entire flow of secondary effluent is reversed to generate rearwardly directed thrust to brake the aircraft. In another aspect spoiler means can be employed with the primary exhaust nozzle means to spoil or vary the forward thrust derived from the primary exhaust effluent discharged from the turbine engine nozzle means. Upon landing, the forward thrust normally derived from the turbine engine can be automatically spoiled responsive to the touchdown sensing device resulting in a net increase in the rearwardly directed thrust.

BRIEF DESCRIPTION OF THE DRAWINGS

A better understanding of the present invention can be derived by reading the ensuing specification in conjunction with the accompanying drawings, wherein:

FIG. 2 is a partially schematic, longitudinal sectional view of the wing, flaps and jet propulsion engine shown in FIG. 1 with the thrust control apparatus illustrated in a cruise configuration;

FIG. 4 is a partially schematic, longitudinal sectional view similar to FIG. 2 illustrating the thrust control apparatus in the final approach configuration;

FIG. 5 is a partially schematic, longitudinal sectional view of a portion of the structure shown in FIG. 2 illustrating the thrust control apparatus in the reversing configuration;

FIGS. 6, 7, 8 and 9 are cross-sectional views of the apparatus illustrated in FIGS. 2 through 5 taken along section lines 6—6, 7—7, 8—8 and 9—9 of FIGS. 2 and 4;

FIG. 10 is an enlarged, detail view of one of the thrust spoilers associated with the turbine engine nozzle.

DESCRIPTION OF PREFERRED EMBODIMENT

Figure 1:
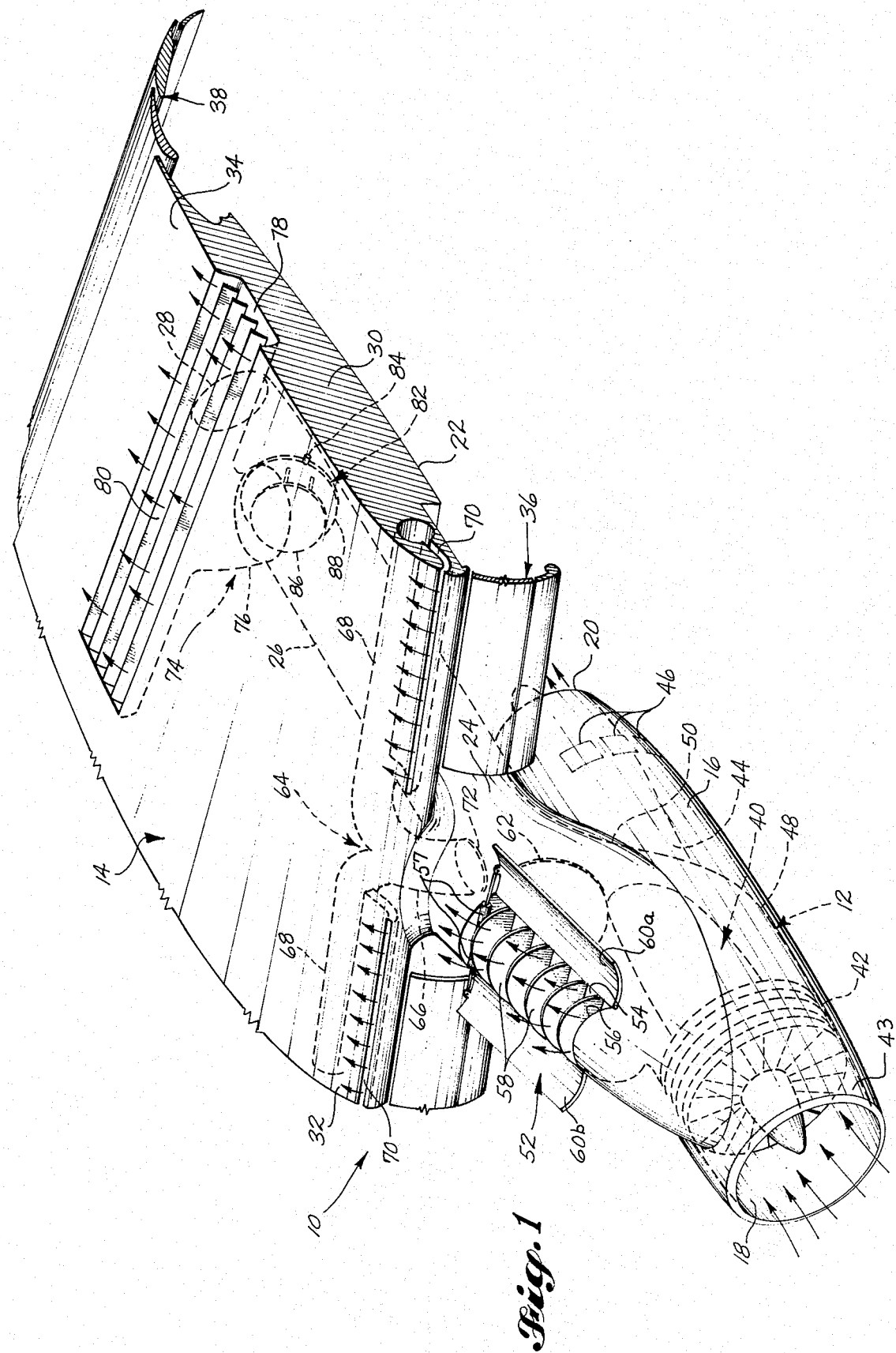
FIG. 1 is an isometric view of a section of an aircraft wing having leading edge flaps and trailing edge flaps and a turbofan jet propulsion engine employing the thrust control apparatus of the present invention.

The thrust control apparatus 10 of the present invention is embodied in an aircraft wing 14 having an underslung, forwardly positioned, pod mounted jet propulsion engine 12 affixed thereto. The thrust control apparatus in this embodiment is configured for use in a STOL-type aircraft having several lift supplementing devices, including leading edge boundary layer control and upper surface blowing nozzles for directing at least a portion of the exhaust effluent from the engine rearwardly over the aft portion of the wing and over the extended trailing edge flaps. The isometric view of FIG. 1 illustrates several portions of the thrust control apparatus and lift supplementing systems in an initial approach mode of operation. In this environment, the conponent parts of the apparatus will first be described followed by an operational description setting forth the manner and sequence of operation of the various systems during cruise (FIG. 2), during an initial approach to a landing field (FIGS. 1 and 4), during a final approach (FIG. 4), and immediately after touchdown of the aircraft (FIG. 5).

Referring first to FIGS. 1 and 2, the wing 14 comprises an aerodynamic airfoil section 30 having a leading edge 32 and a trailing upper surface portion 34. Leading edge flaps 36 of relatively conventional design are mounted in the undersurface of the wing adjacent the leading edge and are capable of being extended downwardly and forwardly as shown in FIG. 1 to increase the camber and chord at the leading edge of the wing. Trailing edge flaps 38 are mounted in a recess provided in the trailing portion of the wing. During normal cruise operation, the trailing edge flaps 38 are retracted and nested in the recess and form the trailing edge of the wing in a relatively conventional manner, as shown in FIG. 2. When extended, the upper surfaces of the trailing edge flaps, in this embodiment shown in three sections, are swung downwardly and rearwardly to a position wherein the upper surface of the trailing edge flaps form a downward and rearward extension of the trailing portion 34 of the upper surface of the wing 14 to increase the camber and chord at the trailing edge of the wing. If desired, the trailing edge flaps 38 can be configured to form a continuous downward and rearward extension of the airfoil surface without any gaps or spanwise slots. Such flaps are used in turning a portion of the exhaust stream directed over the trailing portion of the wing downwardly and rearwardly by the Coanda effect to augment the lift and reduce forward thrust, thereby enabling the aircraft to achieve a steep approach angle to a landing field for a STOL descent.

A jet propulsion engine 12 of the turbofan type is affixed to a wing strut 24 that positions a major portion of the engine at a location downwardly and forwardly from the leading edge 32 of the wing. Conventional mounting structure (not shown) can be employed to mount and locate the engine in this position. The engine is encased in a pod-type nacelle 16, described in more detail later, having an air intake opening 18 at the forward end of the nacelle and a turbine exhaust nozzle opening 20 located under the wing for directing the primary exhaust effluent rearwardly relative to the wing and the engine. An exterior fairing covers the engine mounting strut 24 and fairs into the leading edge 32 of the wing and into the undersurface 22 of the wing rearwardly of and adjacent the leading edge. The turbofan engine 12 has a turbine engine section 40 and a fan section 42. The turbine section 40 generates a relatively high temperature, high pressure, propulsive exhaust effluent, herein referred to as the primary effluent, that is channeled through a rearwardly extending primary effluent nozzle 44 toward the nozzle opening 20. Thrust spoilers 46 are circumferentially disposed about the turbine exhaust nozzle 44 forwardly of the nozzle opening 20. The thrust spoilers include deflection panels that are pivotally mounted in apertures circumferentially disposed about the nozzle. These panels can be pivoted so as to open the apertures to increase the effective nozzle area and simultaneously decrease the internal nozzle pressure, thereby reducing the forward thrust derived from the primary effluent directed from the nozzle opening 20.

The fan section 42 of the turbofan engine generates a relatively low pressure, low temperature, exhaust effluent, herein referred to as the secondary effluent. In a turbofan engine having a high bypass ratio, the secondary effluent can provide on the order of 2 to 4 times the forward thrust generated by the primary effluent. The fan section 42 of the turbofan engine is surrounded by a tubular forward cowl 43, which in conjunction with the forward portion of the outer wall of the turbine engine 40 forms an annular, rearwardly extending, fan duct 48. The annular fan duct 48 is coupled by an intermediate duct 50 to a rearwardly extending tubular duct 26, collectively referred to hereafter as the primary fan air duct. The tubular duct 26 is located adjacent the undersurface 22 of the wing 14 and extends in a rearward direction beyond the turbine exhaust nozzle opening 20. The tubular duct 26 terminates in a rearward opening 28 forming the outlet for a fan air cruise nozzle for directing the secondary effluent in a rearward direction relative to the wing. Referring to FIGS. 1 and 2 and the sectional views of FIGS. 6 through 9, the intermediate coupling duct 50, hereafter referred to as the collector, has a forward annular portion (FIG. 6) that is positioned rearwardly of and is fluid communication with the annular fan duct 48. The collector 50 extends upwardly around the outer wall 45 of the turbine engine 40, transitioning from an annular cross-section to an inverted U-shaped cross-section (FIGS. 7 and 8). As the collector 50 extends above the turbine engine wall 45, the U-shaped duct merges into the cylindrically shaped duct 26 (FIG. 9).

When the turbofan engine is running, ambient air enters through the forward inlet 18 and is compressed by the fan 42. Thereafter, a major portion of the air compressed by the fan 42 passes upwardly and rearwardly into the collector 50 and, during the cruise mode of operation, rearwardly into the cylindrical duct 26 to be exhausted as secondary effluent through the exhaust nozzle opening 28. A portion of the air entering the inlet 18 passes through the fan 42 and enters the compressor section of the turbine 40, is compressed and then combusted in a central portion of the turbine engine, is expanded through a turbine, and is thereafter rearwardly exhausted as primary effluent through the turbine nozzle opening 20.

Still referring to FIGS. 1 and 2, a first auxiliary nozzle system 52 functions as both an upper surface blowing nozzle and a thrust reversing nozzle. A first auxiliary duct 54 is positioned in the engine mounting strut 24 at a location above the collector 50. The bottom end of the first auxiliary duct 54 is coupled to and placed in fluid communication with the upper portion of the collector 50. The upper portion of the first auxiliary duct 54 terminates on the upper surface of the upper forward portion of the strut 24 in a first auxiliary nozzle 56. The first auxiliary nozzle 56 has a generally rectangular shape in plan view. A pair of doors 60, comprising an outboard door 60a and an inboard door 60b, normally completely covers the first auxiliary nozzle 56 during normal cruise operation. The doors 60 in their closed position conform to the upper curved surface of the strut 24 so as to form a smooth, streamlined, outer strut surface. The doors 60 are hinged to the strut 24 adjacent the sides of the first auxiliary nozzle 56 to swing upwardly and sidewardly to expose and open the nozzle 56. Suitable linear actuators 57 (FIG. 1) are mounted in the upper rearward portion of the first auxiliary duct and are connected to the doors 60 to swing them between their open and closed positions.

Positioned below the doors in the first auxiliary nozzle are a plurality of vanes 58 arranged in a serial cascade and oriented transversely to the fore and aft dimension of the first auxiliary nozzle 56. The vanes 58 are pivotally mounted to the strut for fore and aft swinging movement via individual pivot shafts. The vanes 58 are joined together by a common link 59 pivotally connected to each of the vanes at a location below their respective pivotal connections to the strut 24. The link holds the vanes in substantially parallel relationship to form a cascade. The link 59 is coupled to a suitable linear actuator 61. The actuator 61 is mounted in a recess formed in the strut 24 forwardly of the first auxiliary duct. The actuator 61 can be any of a variety of types including fluid energized piston and cylinder assemblies. Upon retraction of the linear actuator 61, the link 59 is moved forwardly. Since the link is coupled to the vanes 58 below their pivotal mountings to the strut 24, the bottom portion of the vanes are swung forwardly while the portion of the vanes above the pivotal axes are swing rearwardly. Upon extension of the actuator 61, the vanes are swung in the opposite direction about their pivotal axes.

When the actuator 61 is in a retracted position, the vanes 58 are oriented to direct secondary effluent flowing through the first auxiliary duct upwardly and rearwardly in front of and over the upper airfoil surface of the wing 14. (See FIGS. 1 and 4.) This mode of operation is employed upon approach to landing as will be described in greater detail later. The net change in forces acting on the wing as a result of directing the secondary effluent over the wing is negligible. Any minor alteration of lift or flight characteristics can be easily overcome by appropriate pilot manipulation of the elevator controls during approach. When the actuator 61 is in an extended position, the vanes 58 are oriented to divert the secondary effluent flowing from the first auxiliary nozzle upwardly and forwardly relative to the engine and the wing, reversing the flow direction of the secondary effluent from a normal rearward flow direction to provide a rearward thrust vector to brake the aircraft after landing. (See FIG. 5.) Reversing the secondary effluent to an upward and rearward direction has two advantages in addition to the provision of a rearwardly directed thrust vector. First, a downward thrust component is generated, which increases the available frictional forces between the wheels and the runway, increasing the effectiveness of conventional wheel braking. Secondly, reingestion of the secondary effluent is eliminated, allowing the engine to continue to generate maximum reverse thrust even down to zero ground speed.

As stated above, the bottom portion of the first auxiliary duct is coupled to the collector 50 of the primary fan air duct. This coupling constitutes an opening over which a valve door 62 is mounted. The opening has a generally circular configuration conforming as necessary to the junction geometry of the auxiliary duct and the collector. The valve door 62 is hinged to the strut 24 about a hinge axis 63 that is oriented transversely to the normal flow of secondary effluent through the primary duct. The hinge axis is located at the upper rearward portion of the opening between the collector and the first auxiliary duct. A suitable linear actuator 65, mounted in a suitable recess provided in the strut 24, is coupled to a flange that extends downwardly and rearwardly from the bottom surface of the valve door 62. The flange is located downwardly and forwardly from the hinge axis 63 of the valve door. When the actuator 61 is fully extended the valve door 61 is positioned to cover the opening between the first auxiliary duct and the collector. When the door is in this position, all of the secondary effluent flows through the primary duct 26. Upon partial retraction of the actuator 65, the valve door 62 can be swung downwardly to a position where the forward edge of the door is positioned in the central portion of the collector 50. In this position the valve door bifurcates the secondary effluent flowing through the collector and diverts a portion of the secondary effluent upwardly through the first auxiliary duct 54. The remaining portion of the secondary effluent is permitted to flow through the primary duct 26. When the actuator 65 is completely retracted, the valve door 62 is swung downwardly and rearwardly to a position where the primary duct is completely blocked. In this position, all of the secondary effluent flowing into the collector 50 is diverted upwardly into the first auxiliary duct 54.

The preferred embodiment of the present invention employs a boundary layer control device, generally designated 64, adjacent the leading edge 32 of the wing 14. The boundary layer control device comprises a spanwise slot 70 in the upper portion of the leading edge panel of the wing 14. Air blown from this slot provides a thin layer of high energy air over the upper surface of the wing 14 to supplement aerodynamic lift at low aircraft speeds. The slot 70 is coupled to a boundary layer air plenum 68 located between the upper and lower surfaces of the wing 14. The plenum 68 is supplied with secondary effluent via a second auxiliary duct 66. The second auxiliary duct 66 extends downwardly from the plenum 68 and is operatively coupled to receive secondary effluent from the primary duct 26. As shown, it is preferred that the second auxiliary duct 66 be connected to the upper portion of the primary duct at a location rearwardly from the main valve door 62 that controls the flow to the first auxiliary duct. A second valve door 72 normally covers the opening between the second auxiliary duct 66 and the primary fan air duct 26. The valve door 72 is pivotally mounted via a suitable hinge assembly 67 at its forward end adjacent the forward portion of the opening between the second auxiliary duct 66 and the primary duct 26. A suitable linear actuator 69, mounted in a recess located in the wing and strut forwardly of the second auxiliary duct, is provided to swing the boundary layer air control valve door upwardly and forwardly from its normally closed position to open the auxiliary duct 66.

A trailing edge, upper surface blowing nozzle, generally designated 74, is also employed in the preferred embodiment. A third auxiliary duct 76 is coupled to the rearward portion of the primary duct 26 at a location forwardly of the exhaust nozzle opening 28. The third auxiliary duct 76 terminates in the trailing portion 34 of the upper surface of the wing 14 in an exhaust nozzle 78. The exhaust nozzle 78 has a longitudinal dimension that extends spanwise along the wing and that is relatively narrow in the chordwise dimension. A plurality of vanes 80, arranged longitudinally in spanwise orientation relative to the wing, are pivotally mounted by suitable mechanism in the upper surface blowing nozzle 78. The vanes 80 are arranged so that they normally overlap to close the nozzle 78 and to form a relatively smooth, upper wing surface over the nozzle. The vanes 80 are interconnected to form a cascade forwardly and below their respective pivotal axes by a common link 75 coupled to a suitable linear actuator 77. Normally, the actuator 77 is in a retracted position to hold the vanes 80 in a closed position. When the actuator 77 is extended, the link is moved rearwardly to swing the vanes 80 about their pivotal mounting axes. In the second position the vanes are oriented to function as a cascade for directing secondary effluent flowing through the third auxiliary nozzle 78 over the trailing portion 34 of the wing 14 and over the upper surface of the flaps 38 when extended. The coupling opening between the third auxiliary duct 76 and the primary fan air duct 26 is normally covered by a valve door 86. The valve door 86 is sized so as to cover the opening between the third auxiliary duct 76 and the primary fan air duct 26. The valve door 86 is rigidly affixed to a diverter door 88 positioned in the primary duct 26 below the valve door 86. The diverter door is pivotally mounted to the sides of the primary duct for swinging movement about an axis that is transverse to the flow direction of secondary effluent through the primary duct. The transverse axis is defined by a mounting shaft 84. The valve door 86 is rigidly connected to the diverter door 88 by four vertically oriented arms 85. The diverter door 88 extends forwardly and rearwardly from its mounting shaft 84 and is normally oriented in the substantially horizontal plane in which the mounting shaft 84 lies so that the door does not substantially interfere with the rearward flow of secondary effluent through the primary duct 26. When the diverter door 88 is pivoted about its shaft 84, its forward edge is sized and shaped to move downwardly and rearwardly and contact the bottom and lower side surfaces of the primary duct 26 while its rearward edge is sized and shaped to move upwardly and forwardly and contact the top and upper side portions of the primary duct 26. When the diverter door is pivoted, the valve door 86 is simultaneously swung downwardly and forwardly from its position closing the third auxiliary duct to a position in the primary duct 26 wherein it is oriented at an angle of approximately 45° relative to the normal direction of flow of secondary effluent through the primary duct 26. In this position the valve door 86 and the diverter door 88 divert the entire flow of secondary effluent traveling through the rearward portion of the primary fan air duct 26 upwardly and into the third auxiliary duct 76. A suitable linear actuator 90 is provided to move the valve and diverter doors 86 and 88 between the position closing the third auxiliary duct and the diverting position.

The outlet area of the first auxiliary nozzle is substantially the same as the outlet area of the primary or main fan air nozzle at the rearward end of the primary duct. Both nozzles are sized to provide maximum thrust when all of the secondary effluent is being exhausted from one or the other. The outlet area of the upper surface blowing nozzle is larger than the outlet area of either the main fan air nozzle or the first auxiliary nozzle. When the secondary effluent is flowing through both the first auxiliary nozzle and the upper surface blowing nozzle, the thrust generated by the secondary effluent is less than maximum theoretical thrust at a given r.p.m. This condition is desireable during approach as will be seen later.

Referring now to FIG. 10, in which a segment of the lower section of the turbine engine exhaust nozzle 44 is illustrated, the nozzle thrust spoilers 46 include an aperture 92 in the wall 94 of the turbine nozzle 44. The aperture 92 is normally closed by a vane or door 96 that is pivotally mounted for swinging movement about a shaft 98 oriented tangentially relative to the circumference of the turbine exhaust nozzle 44. A suitable linear actuator 93 is mounted in recess 95 provided in the wall 94 of the turbine nozzle forwardly of the aperture 92. The arm 97 of the actuator 93 is attached to the door 96 forwardly from its connection to the mounting shaft 98. As the arm 97 of the actuator 93 is extended, the door is caused to pivot about the shaft 98 to open the aperture 92 to the atmosphere. When the arm 97 is retracted, the door 96 is swung inwardly and forwardly to close the aperture 92. When the aperture 92 is open, the outlet area of the nozzle is effectively increased, resulting in a pressure reduction in the primary effluent within the turbine nozzle. This pressure reduction decreases the thrust producing capability of the primary effluent. As schematically depicted in the previous FIGURES, a plurality of such thrust spoilers are disposed circumferentially about the turbine nozzle 44 to provide a large effective nozzle area when the doors are open.

Figure 11:
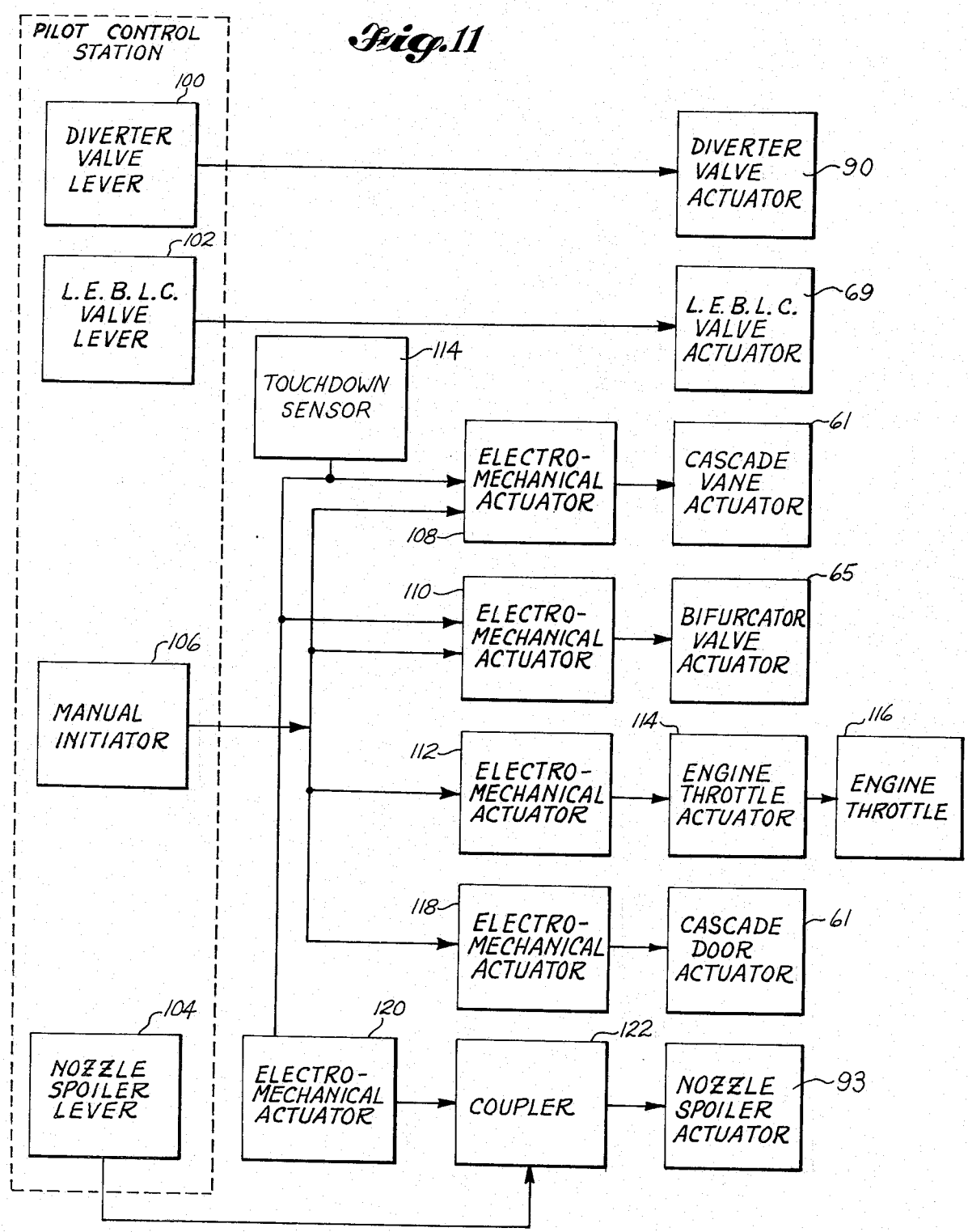
FIG. 11 is a block diagram of the pilot control system and actuators for the thrust control apparatus of the present invention.

Hereafter the use and function of the first auxiliary nozzle 52, the leading edge boundary layer control device 64, the upper surface blowing device 74, including the various valves and diverters, as well as the turbine thrust spoilers 46 will be described in their modes of operation from the cruise move of operation transitioning through the initial descent mode of operation and the final descent mode of operation into the move of operation after touchdown of the aircraft on a landing field. These modes of operation will be described in their normal sequence along with a description of the manipulation of the corresponding controls as required by the pilot. The pilot control station and the appropriate actuators are depicted in block diagram form in FIG. 11.

In the cruise mode of operation depicted in FIG. 2, the trailing edge flaps 38 and the leading edge flaps 36 are both retracted to their cruise position. The valve door 62 covering the opening to the first auxiliary duct 54 is closed to allow all the secondary effluent entering the collector 50 to continue into the primary duct 26. The leading edge boundary layer control valve door 72 is also in a closed position. The third auxiliary duct valve door 86 and the diverter door 88 are in their cruise position allowing all the secondary effluent to be exhausted rearwardly from the fan air exhaust nozzle opening 28 to generate maximum forward thrust. The thrust spoilers 46 associated with the turbine nozzle are closed resulting in maximum thrust generation by the primary exhaust effluent. In this mode of operation the thrust control apparatus is functioning to provide maximum forward thrust on the aircraft with minimum aerodynamic drag, resulting in maximum cruise efficiency of the wing and engine combination.

Figure 3:
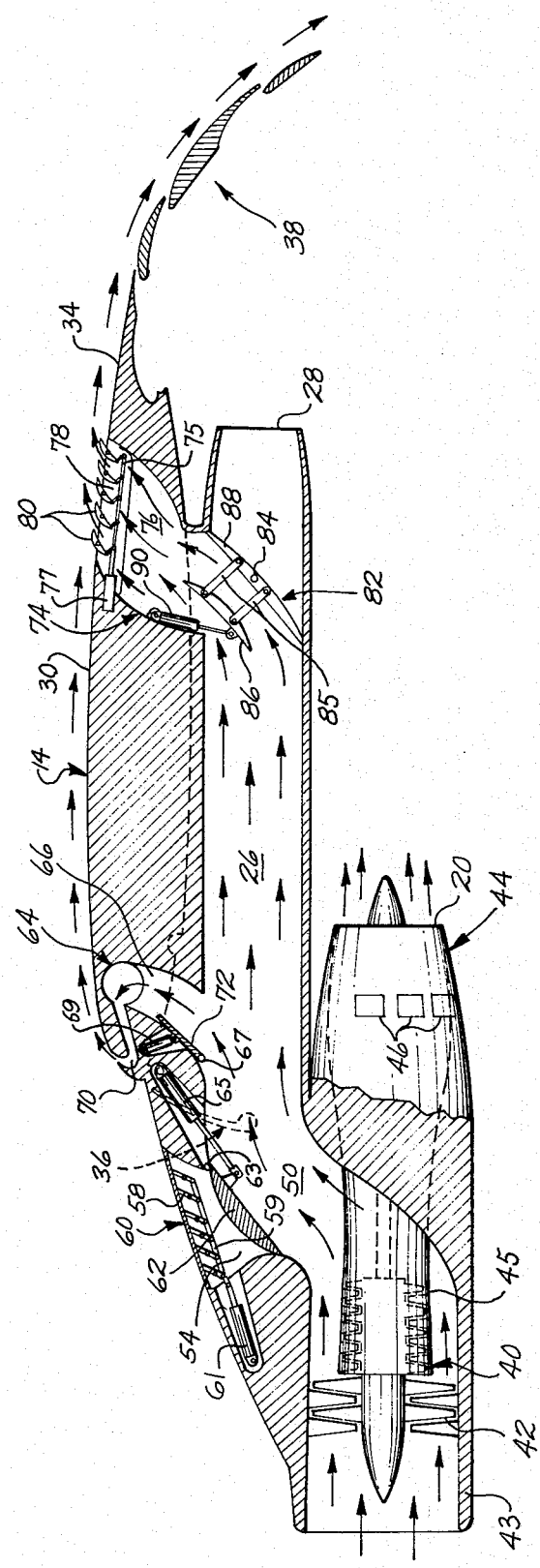
FIG. 3 is a partially schematic, longitudinal sectional view similar to that of FIG. 2 with the thrust control apparatus illustrated in an initial STOL descent configuration.

In the initial phase of STOL descent depicted in FIG. 3, the leading edge flaps 36 and the trailing edge flaps 38 are extended by pilot manipulation of the appropriate controls to increase the camber and chord of the wing 14. In this mode of operation the leading edge boundary layer control valve door 72 is swung upwardly by pilot manipulation of the leading edge boundary layer control lever 102 at the pilot control station. When the valve door 72 is opened, a portion of the fan air flowing through the primary duct 26 is diverted into the boundary layer control plenum and is exhausted from the leading boundary layer cnotrol slot 70. At the same time through pilot manipulation of the diverter valve lever 100, the third auxiliary duct valve door 86 and the diverter door 88 are swung about the mounting shaft 84 so that the remainder of the secondary effluent flowing through the primary duct 26 is diverted upwardly into the third auxiliary duct 76. At the same time through pilot manipulation of the same control, the vanes 80 are pivoted about their pivotal mounting axis to their open position wherein the secondary effluent flowing through the third auxiliary duct 76 is exhausted rearwardly over the trailing portion 34 of the upper surface of the wing 14. The secondary effluent travels rearwardly over the upper airfoil surface of the wing and downwardly and rearwardly across the upper surfaces of the extended trailing edge flaps 38. During the initial phase of STOL descent, the valve door 62 covering the opening to the first auxiliary duct 54 remains closed. The thrust spoilers 46 can remain in their cruise configuration to allow maximum thrust to be generated by the primary effluent exhausted from the turbine exhaust nozzle 20.

During the initial descent phase, the turbofan engine is normally operated at a throttle setting that will result in generation of less than maximum theoretical thrust. Normally, the throttle setting is intermediate between idle and full power, for example, at a setting at which the engine produces on the order of 50% of maximum theoretical thrust. The throttle setting can be manipulated by the pilot to vary the forward thrust acting on the aircraft. Also during the initial descent phase, the thrust spoiler 46 associated with the turbine nozzle can be opened and closed as desired to adjust the forward thrust generated by the turbine effluent. This function is controlled by pilot manipulation of a nozzle spoiler lever 104. The nozzle spoiler lever is linked to a suitable coupler 122, which in turn is linked to the spoiler actuator 93. If it is desired to reduce the forward speed of the airplane, either the throttle setting can be changed or the nozzle spoilers 46 can be opened to reduce the forward thrust generated by the primary exhaust effluent.

During the last stage of descent, immediately before touchdown, the thrust control apparatus is operated in the manner depicted in FIG. 4. The pilot, in accordance with the present invention, initiates several functions including opening the pair of doors 60 covering the first auxiliary nozzle, moving the bifurcating valve door 62 to an intermediate position, and advancing the engine throttle from its intermediate setting to a setting at which the engine can develop thrust at or near its maximum theoretical thrust. These functions are controlled through a manual initiator 106 at the pilot control station that provides a signal via appropriate circuitry to a first electro-mechanical actuator 110 to cause the bifurcating valve actuator 65 to position the bifurcating valve door 62 at its intermediate position. At the same time, the manual initiator 106 provides a signal to a second electro-mechanical actuator 112 that in turn energizes the engine throttle actuator 114 to advance the engine throttle 116 at a predetermined rate from its intermediate setting to a maximum thrust setting. At the same time the manual initiator 106 provides a signal through appropriate circuitry to a third electro-mechanical actuator 118 that in turn energizes the cascade door actuators 61 to open the cascade doors 60a and 60b covering the first auxiliary nozzle. Although mechanism is not specifically shown, the advancing of the engine throttle setting and the opening of the bifurcating valve door 62 can be sequenced so that the amount of secondary effluent being fed to the boundary layer control device 64 and to the upper surface blowing sevice 74 are substantially the same during the initial and final phases of descent. The remaining portion of the secondary effluent being generated by the fan 42 of the turbofan engine is diverted upwardly by the bifurcating door 62 through the first auxiliary duct and is exhausted through the first auxiliary nozzle 56. The manual initiator 106 also simultaneously provides a signal via appropriate circuitry to a fourth electro-mechanical actuator 108 which orients the cascade vanes 58 so as to direct the secondary effluent exhausting from the first auxiliary nozzle 56 upwardly and rearwardly over the upper surface of the wing 14.

The final descent mode of operation can be initiated when the aircraft is, for example, 30 feet above the ground and approximately 400 feet from the desired toughdown point, based on the assumption that the forward speed of the aircraft is about 140 feet per second and that its vertical descent rate is about 10 feet per second. With these assumptions, initiation of the final descent mode of operation would be approximately 3½ seconds prior to touchdown. The final descent mode of operation is continued until the aircraft landing gear (not shown) touch the ground. At touchdown the engine throttle 116 has been fully advanced automatically demanding near maximum r.p.m. from the engine. Because of the fan air nozzle over area inherent in the system the engine does not generate maximum thrust during the final descent stage.

Initiation of the final descent mode of operation can be accomplished manually through pilot manipulation, or if desired, the electro-mechanical actuators can be coupled to a ground proximity sensor (not shown) that would initiate the conversion of the thrust control apparatus from the initial descent mode of operation to the final descent mode of operation.

The reversing mode of operation depicted in FIG. 5 is initiated by an electronic touchdown sensor 114 suitably coupled to the aircraft landing gear. The touchdown sensor 114 provides a signal upon initial compression of the landing gear shock absorbing struts. The touchdown sensor 114 generates a signal that is transmitted via apporopriate circuitry to the electro-mechanical actuator 110, which in turn energizes the bifurcating valve actuator 65 to move the bifurcating valve 62 to its reversing position. In this position the bifurcating valve 62 completely blocks the primary duct 26, diverting all the secondary effluent into the first auxiliary duct. The signal generated by the touchdown sensor is also transmitted via appropriate circuitry to a second electro-mechanical actuator 108, which in turn energizes the cascade vane actuator 61 so as to swing the cascade vanes 58 about their pivotal mounting axes to the reversing position. In this position the vanes 58 are oriented to redirect the secondary effluent flowing from the first auxiliary nozzle 56 to a forward and upward direction. As this occurs, the major portion of the thrust generating exhaust stream is reversed, resulting in a net rearward thrust on the aircraft for braking purposes almost immediately after touchdown. Because the area of the first auxiliary nozzle (or reversing nozzle) is matched to the area of the main fan air nozzle and because the engine r.p.m. is near maximum, near maximum available reverse thrust is generated at this time. At the same time the signal generated by the touchdown sensor is also tramsmitted via appropriate circuitry to another electro-mechanical actuator 120. The electro-mechanical actuator 120, through the mechanical coupler 122, energizes the nozzle spoiler actuator 93 to position the turbine nozzle thrust spoilers 46 so as to increase the effective nozzle area of the turbine exhaust nozzle. When the thrust spoilers 46 are open, the forward thrust generated by the primary effluent is reduced, resulting in an increase in the net rearward or reverse thrust.

When turbine engine thrust spoilers are employed with the thrust control apparatus of the present invention, an added benefit is obtained when they are opened after touchdown. The decrease in pressure in the turbine nozzle causes overspeeding of the turbine engine, which in turn increases the speed of the fan 42 driven by the turbine engine. As the fan speed increases, there is an incremental addition to the secondary effluent flowing through the first auxiliary duct and being directed upwardly and forwardly through the reversing nozzle 56. In this manner the net rearward thrust on the aircraft is increased further. If desired, the area of the turbine nozzle spoiler system can be nearly matched to the normal outlet area of the turbine nozzle to elminiate engine overspeeding but at the same time reduce the forward thrust generated by the primary effluent. Also if desired, a primary effluent thrust reversing mechanism can be substituted for the spoiler system to increase the net rearwardly directed thrust. The utility of a primary effluent reversing mechanism may be limited by undesired impingement of the hot primary effluent on the outer skin of the wing, strut, and aircraft fuselage.

The present invention has been described in relation to a preferred embodiment, specifically an embodiment wherein the quick acting thrust reversing mechanism is employed in conjunction with an aircraft capable of STOL operation. An alternative embodiment within the purview of the present invention is a relatively conventional turbofan engine that is pod mounted below and forwardly of the wing. In the alternate embodiment the annular fan duct can extend rearwardly and surround the rearward portion of the turbine engine to provide a mixed flow configuration, or the fan nozzle opening can be configured in a conventional annular shape surrounding the turbine engine and located forwardly of the turbine exhaust nozzle. In either configuration the fan air is exhausted rearwardly around the primary exhause effluent. In this alternate embodiment, suitable valving and diverter doors can be employed to divert the fan air into a first auxiliary duct such as depicted in the preferred embodiment. If desired, the leading edge boundary layer control ducts and the upper surface blowing ducts can be omitted. During the initial phase of descent to landing the aircraft employing this alternate embodiment of the thrust control apparatus would be operated in a conventional manner. However, during the last phase of descent, the appropriate valving and diverters would be manipulated so that the secondary effluent is at least partially diverted into a first auxiliary nozzle. Vanes similar to those employed in the first auxiliary nozzle of the preferred embodiment would direct the secondary effluent over the upper surface of the wing. A touchdown sensor would be employed to cause the suitable valving and diverters to divert all of the secondary effluent into the first auxiliary nozzle and at the same time the cascade vanes would be reoriented to reverse the direction of flow of the secondary effluent to thereby generate reverse thrust. After reading the foregoing specification, one of ordinary skill in the art will be able to make several changes and alterations in addition to those suggested above, and, moreover, will be able to substitute equivalent means for performing the various functions without departing from the broad concept of the thrust control apparatus disclosed herein. It is therefore intended that the present invention be limited only by the definition contained in the appended claims.

What is claimed is:

1. Thrust control apparatus for a turbofan jet propulsion engine in combination with an aircraft wing and means mounting said engine on said wing, said turbofan jet propulsion engine including a turbine engine having an outer wall terminating in a turbine engine nozzle means for directing a primary exhaust effluent rearwardly from said turbine engine relative to said wing, a cowling surrounding and spaced outwardly from a portion of the wall of said turbine, said cowling and the wall of said turbine defining therebetween a rearwardly extending annular fan duct, and a fan driven by said turbine engine, said fan being operatively positioned in said duct to generate a secondary exhaust effluent and direct said secondary effluent rearwardly through said fan duct, said wing including an upper airfoil surface said apparatus comprising:

a. a primary duct including means operatively coupling said primary duct to said fan duct for collecting said secondary effluent from said fan duct and including fan nozzle means for directing said secondary effluent rearwardly relative to said wing,
 b. an auxiliary duct including means operatively coupling said auxiliary duct to said primary duct and including auxiliary nozzle means for directing said secondary effluent flowing through said auxiliary duct in an upward direction relative to said wing,
 c. first valve means operatively associated with said primary duct and said auxiliary duct for varying the flow therethrough, said first valve means being selectively adjustable between
  1. a cruise position wherein said first valve means is oriented to close said auxiliary duct and to permit flow of said secondary effluent through said primary duct,
  2. at least one intermediate approach position wherein said first valve means is oriented in relation to said primary duct and said auxiliary duct to bifurcate the flow of said secondary effluent between said primary duct and said auxiliary duct, and
  3. a reversing position wherein said first valve means is oriented to close said primary duct and to permit flow of said secondary effluent through said auxiliary duct, and
 d. vane means operatively associated with said auxiliary nozzle means, said vane means being selectively movable between
  1. an approach position wherein said vane means is oriented to divert said secondary effluent rearwardly relative to said wing, and
  2. a reversing position wherein said vane means is oriented to divert said secondary effluent forwardly relative to said wing.

2. The thrust control apparatus of claim 1 wherein said auxiliary nozzle means is located forwardly of said wing to direct said secondary effluent flowing through said auxiliary duct upwardly relative to said wing and in front of said wing, and wherein said vane means is located within said auxiliary nozzle means and is so oriented when in said approach position to divert said secondary effluent exhausting from said auxiliary nozzle means upwardly and rearwardly over the upper airfoil surface of said wing.

3. The thrust control apparatus of claim 2 wherein said wing further includes a trailing edge flap that is movable between a retracted position wherein said upper airfoil surface has a geometry suitable for high speed flight and an extended position increasing the camber of said wing wherein said upper airfoil surface has a geometry suitable for approach and take-off, said apparatus further comprising:

a second auxiliary duct including means operatively coupling said second auxiliary duct to said primary duct at a location rearwardly from the location at which said first auxiliary duct is coupled to said primary duct, said second auxiliary duct further including auxiliary nozzle means associated with said wing and oriented to direct secondary effluent flowing through said second auxiliary duct in a rearward direction over at least the rearward portion of said upper airfoil surface of said wing including said trailing edge flap, and
 a second valve means operatively associated with said primary duct and said second auxiliary duct for varying the flow therethrough, said second valve means being selectively adjustable between
  1. a cruise position wherein said second valve means is oriented to close said second auxiliary duct and to permit flow of said secondary effluent through said primary duct and to permit said secondary effluent to be rearwardly discharged through said primary duct nozzle means, and
  2. an approach position wherein said second valve means is oriented to stop the flow of secondary effluent from said fan nozzle means and to permit flow of said secondary effluent through said second auxiliary duct.

4. The thrust control apparatus of claim 3 wherein said wing has a leading edge, said wing further including a boundary layer control slot located adjacent the forward portion of said wing and oriented to direct effluent flowing therefrom rearwardly across the upper airfoil surface of said wing, said apparatus further comprising:

a third auxiliary duct including means operatively coupling said third auxiliary duct to said primary duct at a location rearwardly from the location at which said first auxiliary duct is coupled to said primary duct and forwardly of the location at which said second auxiliary duct is coupled to said primary duct, said third auxiliary duct further including means operatively coupling said third auxiliary duct to said leading edge boundary layer control slot for channeling at least a portion of said secondary effluent from said primary duct to said leading edge boundary layer control slot, and third valve means operatively associated with said third auxiliary duct for opening and closing said third auxiliary duct.

5. The thrust control apparatus of claim 4 further comprising:

nozzle thrust spoiler means operatively associated with said turbine engine nozzle means for selectively varying the effective outlet area of said turbine engine nozzle means to vary the forward thrust derived from said primary effluent being rearwardly discharged from said turbine engine nozzle means.

6. The thrust control apparatus of claim 5 wherein said means mounting said engine on said wing comprises a strut having an upper end and a lower end, the upper end of said strut being affixed to the lower portion of said wing, said strut extending downwardly and forwardly from said wing, the lower end of said strut being fixed to said jet propulsion engine to positin said jet propulsion engine below said wing and to position a major portion of said jet propulsion engine forwardly of the forward portion of said wing.

7. The thrust control apparatus of claim 6 wherein means coupling said primary duct to said fan duct includes a forward collector portion and a central collector portion, said forward collector portion being coupled to said annular fan duct to receive secondary effluent flowing therethrough, said forward collector portion being annularly shaped and surrounding the wall of said turbine, said central collector portion being coupled to said forward collector portion, said primary duct further including a rearwardly extending circularly shaped duct portion positioned above said turbine nozzle, said fan nozzle means being operatively coupled to said circularly shaped duct portion, said central collector portion extending upwardly and rearwardly from said forward collector portion about the wall of said turbine engine and being coupled to and merging into said rearwardly extending, circularly shaped duct portion, at least the forward collector portion of said primary duct being affixed to and supported by said strut, and wherein said strut has a generally upwardly and forwardly facing portion located forwardly and below the forward portion of said wing, said first auxiliary duct being located within said strut, said first nozzle means associated with said first auxiliary duct being located in said upwardly and forwardly facing portion of said strut.

8. The thrust control apparatus of claim 7 wherein the central collector portion of said primary duct has an upper wall and wherein the means coupling said first auxiliary duct to said primary duct is positioned above and coupled to the central collector portion of said primary duct, the junction of said first auxiliary duct and said primary duct being a first auxiliary opening in the upper wall of the central collector portion of said primary duct, said first auxiliary opening having an aft end, said first valve means comprising a door member and means mounting said door member for fore and aft swinging movement relative to said wing at a location adjacent the aft end of said first auxiliary opening, said door member being sized such that, a. when said door member is moved to said reversing position, said door member swings downwardly to a position closing said primary duct to flow of secondary effluent and diverting the entire flow of secondary secondary into said first auxiliary duct, b. when said door member is moved to said cruise position said first auxiliary opening is closed to stop the flow of said secondary effluent through said auxiliary duct and to permit flow of said secondary effluent through said primary duct, and c. when said door member is moved to one of said intermediate positions between said cruise position and said approach position, said door member swings to an intermediate location in said primary duct to open said first auxiliary opening in said primary duct and to divert a portion of said secondary effluent flowing through said primary duct into said first auxiliary duct.

9. The thrust control apparatus of claim 8 wherein said door member can be positioned in a plurality of intermediate positions said door member in one of said intermediate positions being oriented in said primary duct such that substantially no load is placed upon said door member by said secondary effluent flowing through said primary duct while a portion of said secondary effluent is being bifurcated and diverted by said door member into said first auxiliary duct, said door member in the other of said intermediate positions being oriented to divert a lesser portion of said secondary effluent into said first auxiliary duct while permitting a greater proportion of said secondary effluent to flow through said first auxiliary duct.

10. The thrust control apparatus of claim 1 further comprising:

first actuating means for selectively positioning said vane means in said approach position and in said reversing position, second actuating means for selectively positioning said first valve means in said cruise position, in said at least one intermediate position, and in said reversing position, initiation means for providing a first signal and means for transmitting said first signal to said first and second actuating means, said first actuating means being responsive to said first signal to position said vane means in said approach positions, and said second actuating means being responsive to said first signal to position said first valve means in said at least one intermediate position, and touchdown sensing means for generating a second signal when said aircraft contacts the ground upon landing and means for transmitting said second signal to said first and second actuating means, said first actuating means being responsive to said second signal to position said vane means in said reversing position, and said second actuating means being responsive to said second signal to position said first valve means in said reversing position.

11. The thrust control apparatus of claim 1 wherein said turbofan jet propulsion engine has a throttle for varying the thrust generated by said engine, said apparatus further comprising:

first actuating means for selectively positioning said vane means in said approach position and in said reversing position, second actuating means for selectively positioning said first valve means in said cruise position, in said at least one intermediate position, and in said reversing position, engine throttle actuating means for varying the throttle setting of said turbofan jet propulsion engine between at least a first intermediate setting wherein said engine is generating less than maximum thrust and a second throttle setting wherein said engine is generating greater thrust than when said throttle is at said intermediate setting, initiation means for providing a first signal and means for transmitting said first signal to said first and second actuating means and to said engine throttle actuating means, said first actuating means being responsive to said first signal to position said vane means in said approach position, said second actuating means being responsive to said first signal to position said first valve means in said at least one intermediate position, said throttle actuating means being responsive to said first signal to advance said engine throttle to said second throttle setting.

12. The thrust control apparatus of claim 1 further comprising:

nozzle thrust spoiler means being so constructed and operatively associated with said turbine engine nozzle means for selectively varying the effective outlet area of said turbine engine nozzle means to vary the forward thrust derived from said primary effluent being rearwardly discharged from said turbine engine nozzle means, first actuating means for selectively positioning said vane means in said approach position and in said reversing position, second actuating means for selectively positioning said first valve means in said cruise position, in said at least one intermediate position, and in said reversing position, nozzle spoiler actuating means for selectively positioning said nozzle thrust spoiler means between at least a first position wherein the effective outlet area is maximized to minimize the thrust derived from said primary effluent and at least a second position wherein said outlet area is reduced relative to the outlet area when in said first position to increase the thrust derived from said primary effluent, initiation means for providing a first signal and means for transmitting said first signal to said first and second actuating means, said first actuating means being responsive to said first signal to position said vane means in said approach position, said second actuating means being responsive to said first signal position said first valve means in said at least one intermediate position, said nozzle thrust spoiler actuating means being responsive to said first signal to position said nozzle thrust spoiler means in said first position, and touchdown sensing means for generating a second signal when said aircraft contacts the ground and means for transmitting said second signal to said first and second actuating means, said first actuating means being responsive to said second signal to position said vane means in said reversing position, said second actuating means being responsive to said second signal to position said first valve means in said reversing position.

13. The thrust control apparatus of claim 12 further comprising:

manual actuating means operatively coupled to said nozzle spoiler actuating means to selectively vary the position of said nozzle thrust spoiler means between said first and second positions to very the thrust derived from said primary effluent, said nozzle spoiler actuating means being further responsive to said second signal to override said manual actuating means and to position said thrust spoiler means in said first position when said aircraft contacts the ground.

* * * * *

UNITED STATES PATENT AND TRADEMARK OFFICE
CERTIFICATE OF CORRECTION

PATENT NO. : 3,920,203
DATED : November 18, 1975
INVENTOR(S) : James R. Moorehead It is certified that error appears in the above-identified patent and that said Letters Patent are hereby corrected as shown below:

Column 15, line 39: delete "positin" and insert therefore --position--.

Column 16, line 22: delete "secondary", second occurrence and insert therefore --effluent--.

Column 18, line 42: delete "very" and insert therefore --vary--.

Signed and Sealed this twenty-fourth Day of February 1976

[SEAL]

Attest:

RUTH C. MASON
Attesting Officer

C. MARSHALL DANN
Commissioner of Patents and Trademarks